United States Patent
Zhang et al.

(10) Patent No.: US 8,308,957 B2
(45) Date of Patent: Nov. 13, 2012

(54) PROCESS FOR SEPARATING MERCAPTANS FROM CAUSTIC

(75) Inventors: Tiejun Zhang, Bellaire, TX (US); V. Keith Turner, La Porte, TX (US)

(73) Assignee: Merichem Company, Houston, TX (US)

( * ) Notice: Subject to any disclaimer, the term of this patent is extended or adjusted under 35 U.S.C. 154(b) by 296 days.

(21) Appl. No.: 12/849,408

(22) Filed: Aug. 3, 2010

(65) Prior Publication Data

US 2010/0320124 A1    Dec. 23, 2010

Related U.S. Application Data

(63) Continuation-in-part of application No. 11/818,300, filed on Jun. 14, 2007, now Pat. No. 7,833,499.

(51) Int. Cl.
*C01D 1/36* (2006.01)

(52) U.S. Cl. ........ 210/708; 210/718; 210/721; 210/750; 210/763; 210/799; 210/804; 210/805; 423/183

(58) Field of Classification Search .......... 210/691–694, 210/708, 718, 721, 750, 763, 799, 804, 806, 210/DIG. 5; 208/203; 423/183
See application file for complete search history.

(56) References Cited

U.S. PATENT DOCUMENTS

| | | | |
|---|---|---|---|
| 3,574,093 | A | 4/1971 | Strong |
| 3,758,404 | A | 9/1973 | Clonts |
| 3,977,829 | A | 8/1976 | Clonts |
| 3,992,156 | A | 11/1976 | Clonts |
| 4,626,341 | A | 12/1986 | Verachtert |
| 4,666,689 | A | 5/1987 | Maple et al. |
| 4,875,997 | A | 10/1989 | Langford |
| 5,017,294 | A | 5/1991 | Durrieu |
| 5,480,547 | A | 1/1996 | Williamson et al. |

FOREIGN PATENT DOCUMENTS

| | | |
|---|---|---|
| CA | 507179 | 11/1954 |
| EP | 0207797 | 1/1987 |

OTHER PUBLICATIONS

International Search Report and Written Opinion for PCT/US2008/006403 mailed on Nov. 20, 2008, completed on Sep. 29, 2008.

*Primary Examiner* — Matthew Savage
(74) *Attorney, Agent, or Firm* — McDonnell Boehnen Hulbert & Berghoff LLP

(57) ABSTRACT

A separation process for separating two or more immiscible liquids using contactors utilizing high surface area vertical hanging fibers is disclosed. This separation process is especially useful in the separation of disulfide oil formed during the oxidation of spent caustic solution that was used to remove sulfur contaminates from light hydrocarbons.

5 Claims, 4 Drawing Sheets

PROCESS FOR SEPARATING MERCAPTANS FROM CAUSTIC

CROSS REFERENCE TO RELATED APPLICATIONS

This application is a continuation-in-part of U.S. patent application Ser. No. 11/818,300, filed on Jun. 14, 2007, the entire contents of which are incorporated herein by reference.

FIELD OF INVENTION

Our invention relates generally to a novel separation technology that uses the high surface area and coalescing properties of high surface area vertical hanging fibers to achieve rapid separation of two immiscible liquids. A specific application of our invention relates to an improved separation process that is conducted in a single vessel where an admixture of disulfides and caustic solution created during a process for the removal of sulfur and other contaminants from hydrocarbons, including liquid petroleum gas ("LPG"), is separated into an aqueous caustic stream for recycle and an organic stream containing the disulfides. Our invention significantly reduces separation residence times, thus reducing equipment costs and improving the overall efficiency of the process.

BACKGROUND

Separation of two immiscible liquids into two distinct liquid layers for recovery of each is well known to the art. However, most separation devices rely primarily on large vessels that use gravity and long residence times to achieve the phase separation or formation of distinct layers. Alternatively, forced physical separation of the two liquids is accomplished using complex mechanical devices, such as centrifuges, which also require a large energy input, or using membranes with selective permeability characteristics. With pressing needs for more economical processes that also are more compact to conserve space, a smaller more efficient separation is needed.

The enactment of the US Clean Air Act of 1990 has reached its zenith in North America with the gasoline pool being required to contain less than 10-wppm of sulfur. This means from a practical standpoint that the refinery normally makes a gasoline pool containing less than 5-wppm to allow for pipeline contamination of residue wall "clingage" sulfur from previous shipments and the accuracy of the testing method dictated by the Clean Air Act.

Another consequence of the Clean Air Act of 1990 has been the shutting down of the small inefficient refiners in America going from 330 plus refiners in 1980 to less than 175 refiners in 2007. No new refiners have been built in the past 25 years, but refiner expansions and imports have satisfied the gasoline demand in America.

The existing refiners have also gone to higher severity Fluid Catalytic Cracking Unit operations to reduce the amount of burner fuel while producing additional higher octane gasoline and increased olefin production. These olefins are propane/propylene and butane/isobutane/isobutylene. These are the feedstocks for the next processing step which is an alkylation unit. Some refiners alkylate amylenes (pentene) depending on their economic models.

Most refineries use either an HF (hydrofluoric acid) or a sulfuric acid alkylation unit to alkylate mixed butylenes or mixed propylene's and butylenes. Alkylation is a process where isobutane reacts with the olefin to make a branched chain paraffin. Since sulfur is detrimental to the alkylation process, a caustic treating system is in place at most refineries to extract the easily extracted methyl and ethyl mercaptans and the more difficult propyl mercaptans present in the mixed olefinic liquid petroleum gas ("LPG") stream.

Typically, liquid-liquid contactors are employed for the caustic treatment and in some cases FIBER FILM® contactors, which are marketed and sold by the Merichem Company (Houston, Tex.) and as described in U.S. Pat. Nos. 3,758,404; 3,977,829 and 3,992,156, all of which are incorporated herein by reference. To conserve caustic, a caustic regenerator is almost always employed. A typical process flow scheme for treating LPG involves a first caustic treatment using at least one liquid-liquid contactor to extract the sulfur contaminants, typically mercaptans, from the LPG feed, which generates a "spent" caustic solution that is rich in mercaptan or so called rich caustic, separating the LPG in the contactor, oxidizing the rich caustic to convert mercaptans to disulfides (typically referred to as disulfide oil ("DSO")) which generates an "oxidized" caustic solution, and then using a gravity separator to separate the DSO from the oxidized caustic solution. In some instances a granular coal bed is used in conjunction with the gravity settling device as a coalescer to further assist in the separation of the DSO from the oxidized caustic. Once the DSO is removed, the regenerated caustic can then be recycled and mixed with fresh make-up caustic and used in the liquid-liquid contactors to treat the LPG feed.

As mentioned, the use of gravity settling devices in prior art processes are plagued by the requirement of long residence times, especially when applied to separating DSO from an oxidized caustic solution. These long residence times negatively impact the economics of the caustic treating process. In addition, the prior art gravity settlers are relatively large pieces of equipment. Likewise, the forced separation devices, such as centrifuges, are complex mechanical devices that require large energy input to operate. Our invention now solves the problems found in prior art separation equipment when two immiscible liquids need separation and particularly when applied to separating DSO from caustic solutions. In particular, our invention performs the entire process in a single column. Our invention further utilizes two novel improvements that can be employed separately or in combination. The first involves the use of FIBER FILM® technology, which is typically only found in liquid-liquid contacting applications, and the second involves the use of solvent injection before oxidation of the spent caustic solution. Our process can also use one or more polishing steps after DSO separation to further remove residual DSO from the oxidized caustic solution. Greatly reduced residence times and the reduction in equipment size translate into an extremely economical method of removing sulfur compounds from LPG, and consequently, minimize capital and operating costs. These and other advantages will become evident from the following more detailed description of the invention.

SUMMARY

As mentioned, our invention relates to an improved separation process for separating an admixture of at least two immiscible liquids in a single tower, column, or vessel using FIBER FILM® technology and finds specific application in the separation of DSO and other hydrocarbons from a caustic solution. Our invention achieves separation residence times many times faster than conventional gravity settlers whether or not such conventional settlers use a coal bed coalescer. Moreover, we have found that using a small amount of solvent added prior to the oxidation step further improves the separation performance over conventional gravity settler technology.

Although it is well known to use FIBER FILM® technology in co-current liquid-liquid contactor applications in which two immiscible liquids contact each other for enhanced mass transfer of certain compounds, the art has not recognized that FIBER FILM® technology is capable of performing an actual separation of two immiscible liquids fed as an admixture in a single stream and that two or more contactor stages, each containing multiple vertical hanging fibers, can be configured in a counter-current fashion to achieve even greater separation without multiplying solvent consumption. This is despite the fact that the FIBER FILM® technology has been commercialized for 35 plus years while the need for an efficient and improved separation process has long existed. Likewise, we are unaware of the use of FIBER FILM® technology for separation because the fibers do not provide the selectivity resulted from physical size restriction as in the membrane technology, nor does it force physical separation by large energy input such as in the centrifuge technology. Instead, our invention utilizes large surface area fibers to form thin liquid films within which a coalescing effect is achieved due to a drastically restricted path length.

In prior art processes, such as that taught in U.S. Pat. No. 5,017,294 (Derrieu) and U.S. Pat. No. 5,480,547 (Williamson), the processes are designed to separate aqueous droplets (where the aqueous phase is discontinuous) from organic hydrocarbon (which is continuous). When fibers are utilized, the aqueous droplets would wet the fiber surface and coalesce to coat the fibers and run off along the fibers. However, it was not known or obvious whether such FIBER FILM® technology could be used to separate organic droplets from continuous aqueous phase when the fibers are wettable by the aqueous phase. Likewise, it was unknown to us what level of organic hydrocarbon separation could be achieved by such technology. We have surprisingly found that separating organic droplets or dissolved organic from aqueous caustic solution is in fact possible using FIBER FILM® technology. In our invention, the fibers are still wettable by the aqueous phase, however, the organic hydrocarbon droplets and dissolved organics coalesce, not because of their contacting with fibers, but because of the limit imposed on them by the short path they can move around within the thin film of the aqueous phase which forms around the fiber. A closer look at the prior art processes mentioned above indicates that those processes target to remove aqueous droplets or so-called free "water" and are not effective for removing dissolved water from an organic phase. In our invention, we remove free organic droplets as well as dissolved organics (solvent+DSO).

As used herein, disulfide oil or DSO is meant to include a mixture of possible disulfides, including dimethyl disulfide, diethyl disulfide, methyl ethyl disulfide and higher disulfides. Likewise, the term mercaptan is meant to include any of a class of organosulfur compounds that are similar to the alcohol and phenol, but containing a sulfur atom in place of the oxygen atom. Compounds containing —SH as the principal group directly attached to carbon are named 'thiols'.

One aspect of our invention involves the use of only a single piece of equipment (i.e., a single tower) to oxidize an organic stream to convert contaminants followed by a separation of at least two immiscible liquids, such as, but not limited to, an admixture of water, or an aqueous solution, and hydrocarbons. This admixture is fed as a single stream to a separation device where the single stream contacts a bundle of high surface area fibers. As the admixture contacts and runs down the numerous individual fibers, a thin film of liquid is formed around each fiber and a coalescing effect is achieved due to the drastically restricted path length within the liquid film. In conjunction with the exceptionally high surface area of the fiber films, the two liquids quickly separate from each other and form two distinct layers in a collection zone at the bottom of separation device. The two distinct liquid layers, a lower layer comprising the higher density liquid and an upper layer comprising the lower density liquid allow for each to be withdrawn separately from the separation device. Examples of admixtures that benefit from the novel separation process of our invention include, but are not limited to, admixtures of hydrocarbons, such as propane, butanes, pentanes, condensate, natural gas, molecular sieve regeneration gas, diesel, kerosene, gasoline, lube oils, light crude, edible oil, biofuel, biodiesel, biodiesel reaction products, and any reaction products from a petrochemical plant such as polyols, POSM, and vinyl chloride and water, with water or an aqueous solution, including acidic, neutral or basic solutions that may contain dissolved salts and other organic or inorganic constituents. As a result of using FIBER FILM® technology we have surprisingly found that residence times are greatly reduced by an order of magnitude compared to the conventional gravity settling equipment. We believe this is caused by the increased interfacial surface area as compared to a conventional gravity separator (CGS), even in circumstances where the CGS uses a coal bed as a coalescer.

Our invention also finds a specific application in processes for removing sulfur contaminants from LPG and other hydrocarbon streams where a stream of rich caustic containing mercaptan compounds is fed to an oxidizer. Oxidizing the mercaptan compounds to form DSO at a conversion level of 90% or greater in the presence of an oxygen containing gas, which results in the formation of an admixture of DSO, caustic and gas; feeding this admixture as a single stream to a separation device where the admixture contacts a bundle of vertical hanging fibers; separating the DSO from the caustic within the separation device by forming two distinct liquid layers in a collection zone at the bottom of the separation device, where the lower layer comprises a caustic phase and the upper layer comprises DSO; and removing the DSO from the separation device by withdrawing a portion of the upper layer and removing the caustic from the separation device by withdrawing a portion of the lower layer.

Although the art has recognized that gravity settling can be used to separate water (or an aqueous solution) from hydrocarbons, those prior art separation techniques typically require the use of one or more a liquid-liquid contactors downstream of the CGS where a flow of solvent is used to wash the separated oxidized caustic solution to extract residual DSO down to acceptable levels so the caustic is suitable for recycling back to the primary liquid-liquid contactor section where the contaminated hydrocarbons, such as LPG, are fed. Our invention replaces both the CGS and the downstream liquid-liquid contactors with a single process vessel containing the oxidizer and one or more separation stages utilizing vertical hanging fibers. This clearly saves on capital and operating costs, but also saves valuable real estate because its foot print is much smaller than the combination of the CGS and liquid-liquid contactors. As mentioned, it is well known to use FIBER FILM® technology in liquid-liquid contactor applications; however, we are unaware of any FIBER FILM® technology to perform separation of two immiscible liquids, as a DSO rich hydrocarbon and caustic. Our invention also does not require any solvent addition to effect separation of the DSO from the oxidized caustic solution. Unique to our invention is the requirement of only a single stream containing an admixture of the immiscible liquids being fed to the separator device containing the bundle of fibers. No additional process streams are needed to effect the separation. In a specific application of our process we were able to separate DSO from oxidized caustic solution down to below 5 ppm in the caustic. Our invention will also find utility in reverse process applications where an acidic aqueous solution is used to extract basic compounds from a liquid, such as a hydrocarbon based liquid. The only important factor is that only a single vessel is used and at least two immiscible liquids leaving the oxidizer section are fed as an admixture in a single stream to at least one separator using hanging fibers.

These and other objects will become more apparent from the detail description of the preferred embodiment contained below.

DETAILED DESCRIPTION

As stated, our invention concerns a novel process for the separation of at least two immiscible liquids in an admixture using FIBER FILM® technology. One specific application of our invention relates to caustic treatment of hydrocarbons, such as LPG to remove contaminants, such as sulfur compounds, that are deleterious to downstream processes. In particular, our invention replaces conventional gravity settlers or forced separation technology, such as centrifuges, with a separation vessel employing high surface area fibers to separate oxidized sulfur contaminants from the caustic solution. This novel use of vertical hanging fibers with high surface area drastically reduces the residence time typically needed for separation by an order of magnitude. In addition, we have found that the addition of a small stream of solvent into, or upstream of, the oxidizer further improves the downstream separation performance when using FIBER FILM® technology.

Figure 1:
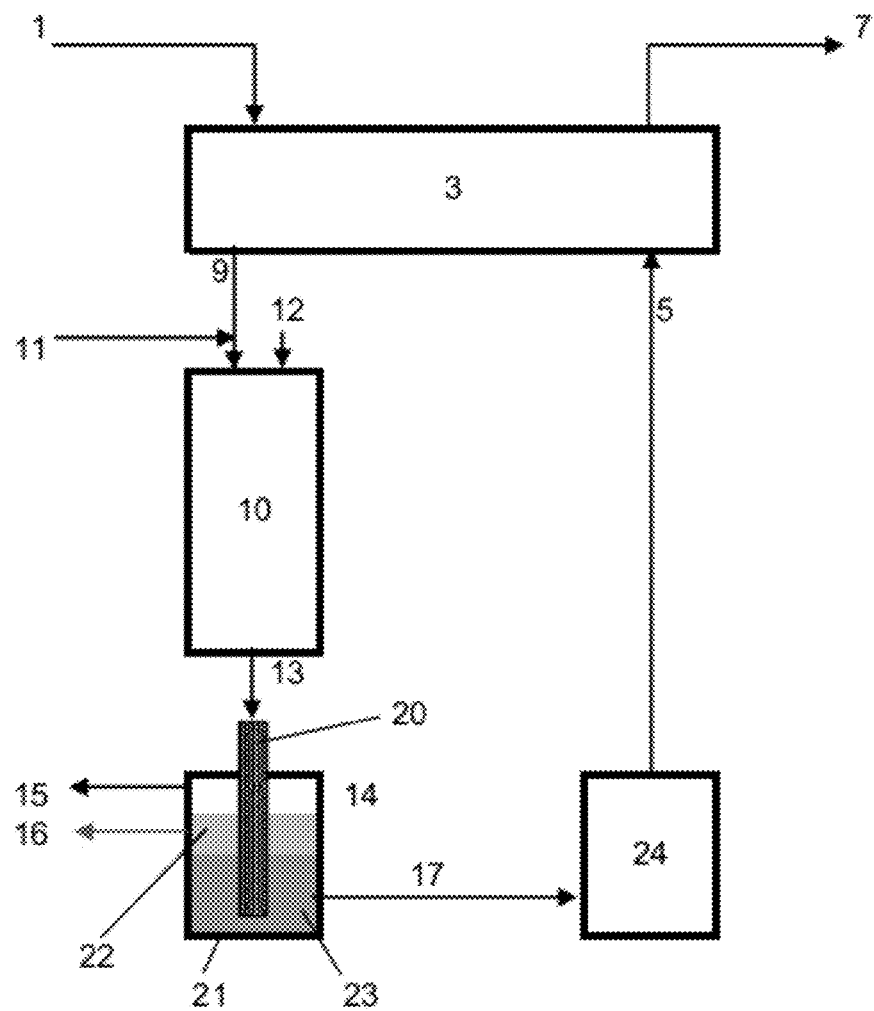
FIG. 1 schematically illustrates one possible embodiment of the process of our invention using FIBER FILM® technology to separate DSO from caustic, where a small stream of solvent is added prior to the oxidation step.

FIG. 1 illustrates one embodiment of our invention where LPG feed, contaminated with mercaptan compounds, for example ethyl mercaptide, is fed via line 1 to a caustic treatment section 3. The specific design of the caustic treatment section is not critical to our invention; however, a preferred design includes staged contactors operating in a countercurrent configuration, with a most preferred contactor configuration using hanging fibers in liquid-liquid contactors. These as well as other contactor configurations are well known to those skilled in the art. Lean caustic is fed via line 5 into contactor treatment section 3 where it mixes with LPG introduced via line 1. The caustic used in our invention can be any type known to the art of sweetening hydrocarbons, including solutions comprising NaOH, KOH, Ca(OH)2, Na2CO3, ammonia, extraction of organic acids, or mixtures thereof. Preferably, the caustic comprises aqueous potassium hydroxide solutions and aqueous sodium hydroxide solutions having concentration of from about 1% to about 50%, more preferably from about 3% to about 25%, still more preferably from about 5% to about 20%, by weight alkali hydroxide.

Substantially sulfur free LPG is removed from contactor section 3 via line 7 and is used in subsequent processes, for example, in an alkylation unit. By substantially sulfur free we mean the LPG has a sulfur level of <150 ppm total sulfur, preferably <20 ppm total sulfur and more preferably <10 ppm total sulfur. The caustic solution from contactor section 3 is a rich caustic solution that is removed via line 9. Rich caustic contains the mercaptans and other sulfur contaminants extracted from the LPG feed.

The rich caustic from the caustic treatment section is then fed to oxidizer 10. As with the liquid-liquid contactors, the exact design of the oxidizer is not critical to our invention and any number of oxidizer designs may be used, such as air bubble oxidizers, non-catalytic solid packing and solid catalyst technology. A preferred oxidizer is one that contains a solid bed of catalyst, preferably a catalyst containing an active metal, such as cobalt, impregnated on a solid support, for example, activated carbon. A most preferred catalyst is one sold commercially by Merichem Company under the brand name ARI™-120L. In one alternative embodiment of our invention a small volume solvent stream 11 is introduced to oxidizer 10 along with the rich caustic stream. This solvent stream can be mixed with the rich caustic prior to entering the oxidizer or injected as a separate stream into the oxidizer. The solvent can be any light hydrocarbon that will assist in the downstream separation of the DSO from the caustic solution after oxidation. Any relatively light hydrocarbon or mixture of such hydrocarbons can be used as a solvent in our invention, however, preferred solvents included naphtha and kerosene. Although the exact mechanism of how the solvent improves the separation of DSO from the oxidized caustic is not specifically known, one theory is that the solvent has a much higher solubility of DSO than caustic, with their differential of solubility providing an extractive driving force. This effect is further magnified by carrying out the process in a FIBER FILM® device that provides higher interfacial surface area. The amount of solvent, based on the volume percent of the rich caustic feed, injected into the oxidizer, either with the rich caustic or separately, is not especially critical to our invention as long as a minimum amount is used so as to improve the down-stream separation performance. As mentioned only a small volume of solvent is needed, with a preferred range of minimum solvent injection from about 0.1 vol % to about 10.0 vol %, preferably from about 0.5 vol. % to about 5.0 vol. %, of the rich caustic feed via line 9.

In addition to the rich caustic and solvent feeds to the oxidizer, air or other oxygen containing gas(es) is introduced to the oxidizer through line 12. The amount of oxygen containing gas added to the oxidizer is sufficient to achieve 95+% oxidation of the mercaptan compounds originally present in the LPG to disulfide compounds, most preferably 99+% oxidation. A preferred range of operating conditions for the oxidizer includes a temperature of from about 75° F. to about 200° F. and a caustic flow rate of as high as 10 LHSV, but preferably from about 100° F. to about 150° F. and less than 5 LHSV. The operating pressure of our process is not critical so long as it keeps the process streams in a liquid state.

The effluent from oxidizer 10, or the oxidized caustic, which is an admixture of caustic and DSO, is removed via line 13 from oxidizer 10 and passed to separator 14 where the DSO is separated from the caustic using vertical hanging fibers. Separator 14 can be any device that uses a column of tightly packed fibers and that provides large surface area. As mentioned, such fiber film technology has been used in the past in liquid-liquid contactors to facilitate mass transfer of chemical compounds from one liquid to another liquid, but to our knowledge have never been employed solely for the purpose of separating an admixture of two or more immiscible liquids. The design of these fiber film liquid-liquid contactors has been described in various references, for example, in U.S. Pat. Nos. 3,758,404, 3,992,156, 4,666,689, 4,675,100 and 4,753,722, all of which are incorporated herein by reference for all purposes. Our invention is the first to utilize fiber film technology in a separation application. We are not using it as a mass transfer liquid-liquid contactor. Accordingly, only a single feed stream needs to be fed to the bundles of high surface area fibers. In the specific application illustrated in FIG. 1, the admixture comprises oxidized caustic containing DSO and residual gases. This admixture is fed via single line 13 to separator 14. The oxidized caustic with DSO and gases enters the top of the fiber bundle 20 that comprises substantially elongated fibers mounted in a shroud and contained within a conduit. This conduit is provided with an inlet flange and a fluid distribution means for distributing the oxidized caustic with DSO from line 13 onto the fibers. The fibers in separator 14 are selected from a group consisting of, but not limited to, metal fibers, glass fibers, polymer fibers, graphite fibers and carbon fibers to meet two criteria: (1) the fiber material must be preferentially wetted by the admixture of at least two immiscible liquids; and (2) the fibers must be of a material that will not contaminate the process or be destroyed by it, such as by corrosion.

During the operation of separator 14 two layers form in the bottom of collection vessel 21; a lower layer 23 comprising regenerated caustic solution and an upper layer 22 comprising separated DSO. FIG. 1 also illustrates an alternative embodiment where a small stream of solvent added upstream of oxidizer 10. When this alternative is used, the added solvent is removed along with the DSO in upper layer 22. Off gases are removed from the top of collection vessel 21 through line 15. The shroud and fibers of the fiber bundle extend partly within the confines of separator 14, with the positioning of the downstream end of the fiber bundle within collection vessel 21 being such that the downstream end within lower layer 23. The DSO plus solvent in upper layer 22 is removed from separator vessel 14 via line 16 and sent to storage or for further processing.

The residence time within separator 14 is selected to achieve maximum removal of the DSO from the caustic phase, with the target concentration being 5 ppm or less. Surprisingly, we have found that the use of vertical hanging fibers, with and without the added solvent, greatly decreases the required residence time by an order of magnitude compared to a conventional gravity settling device. As explained more fully in the examples below, the use of hanging fibers reduces residence time from approximately 90 minutes for a gravity settler to less than 5 minutes for a separator of our invention that uses vertical hanging fibers. Adding solvent as explained above further improves separation performance as shown by the graph described in the following examples.

The rate of removal of the caustic solution in lower layer 23 via line 17 is adjusted to maintain the correct residence time necessary to achieve DSO levels in this layer to 5 ppm or less measured as sulfur. The separated caustic solution in stream 17 may be further purified in a polishing unit 24, to ensure that its DSO content is less than 5 ppm. Various polishing procedures are well known to the art, most of which involve liquid/liquid contacting technology. The final purified caustic is then removed from vessel 24 as lean caustic and recycled via line 5 to the caustic treatment section 3.

Figure 3:
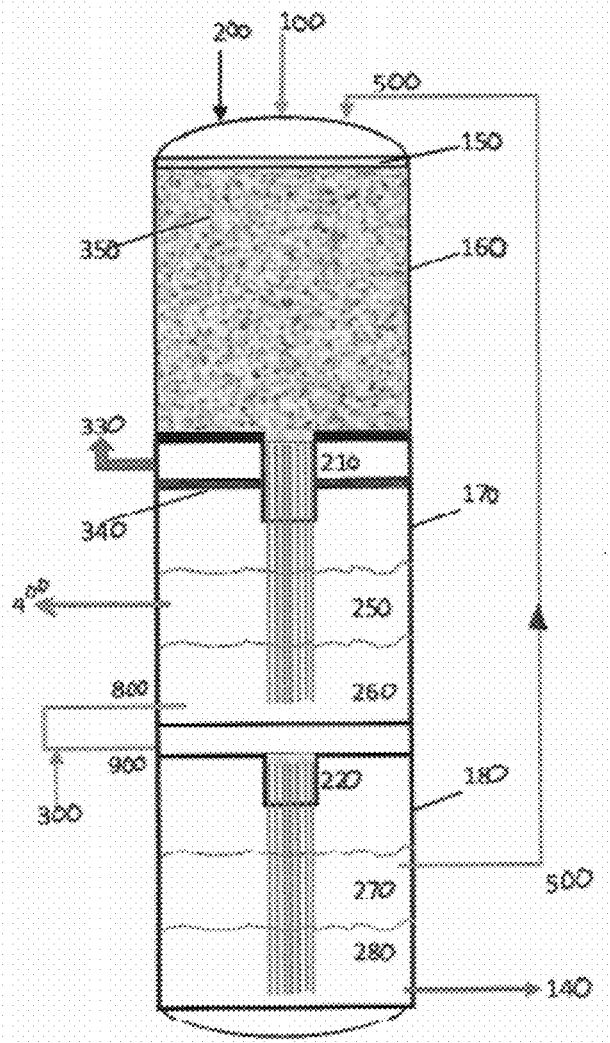
FIG. 3 shows another possible embodiment of our invention having a single tower design with the oxidizer on top and two FIBER FILM® separators (FFS's) in series below the oxidizer.

FIG. 3 illustrates the process of our invention conducted in a single vessel where rich or spent caustic 100 enters the top of oxidizer section 160, along with air 200 and solvent 500. The streams are combined and introduced to the top of solid catalyst bed 350 through distributor 150. The oxidation of mercaptides into disulfide oil (DSO) occurs within the catalyst bed 350, which results in a mixture composed of continuous phase caustic, discontinuous phase organic (solvent+ DSO) droplets dispersed in the caustic phase, and gas (nitrogen and unreacted oxygen from air). The mixture exiting the oxidizer 160 enters the first shroud containing a bundle of vertical hanging fibers with an inlet distributor 210, which is located in section 170. Gas from oxidizer 160 disengages from liquid stream at the outlet of the fiber bundle cast and exits through a mist eliminator 340 as offgas 330. The two immiscible liquids, as a single stream, flow downwards along the vertical fibers during which organic hydrocarbon droplets coalesce and form a top organic layer 250, while the aqueous caustic adheres to the fibers and flows further downward to form a bottom caustic layer 260.

A spent solvent stream that contains DSO 400 is withdrawn from the top organic layer 250 inside separation section 170. A caustic stream 800, with substantially reduced amount of DSO, is withdrawn from the bottom caustic layer 260. Caustic stream 800 is further mixed with fresh solvent 300 to form stream 900, and enters the second separation section 180 containing a vertical fiber bundle with an inlet distributor 220. The liquid stream flows downwards along the vertical fibers during which remaining organic droplets coalesce and form a top organic layer 270, while the aqueous caustic adheres to the fibers and flows further downward to form a bottom caustic layer 280. A recycle solvent stream that contains a low content DSO 500 is withdrawn from the top organic layer 270 inside separation section 180 and is recycled to the top of the oxidizer vessel 160. A regenerated or lean caustic stream 140, with very low DSO content, is withdrawn from the bottom caustic layer 280 inside the second separation section 180.

Figure 4:
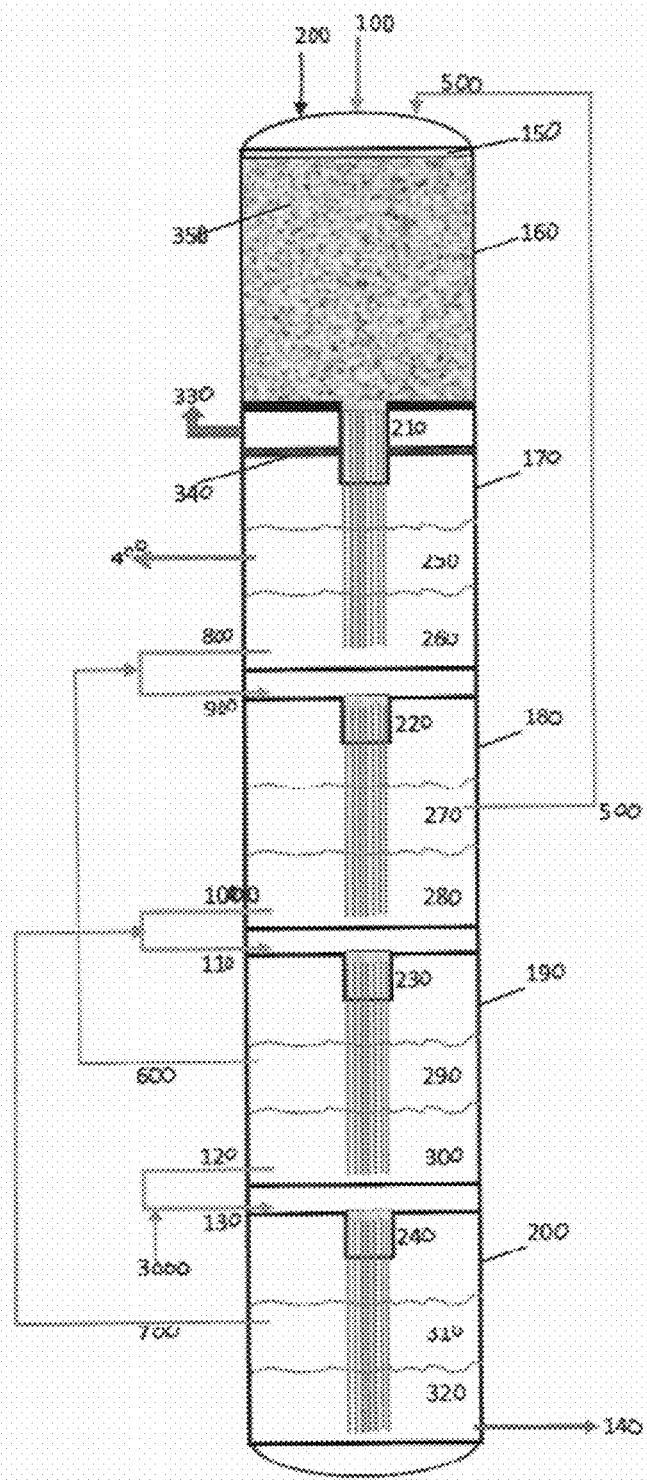
FIG. 4 shows a schematic of the single tower design of our invention with the oxidizer on top and four FIBER FILM® separators (FFS's) in series below the oxidizer.

FIG. 4 shows another embodiment of our invention where two additional FIBER FILM® separation (FFS) sections are added to the single tower to achieve an even greater purification of caustic. This embodiment has four stages of FFS, i.e., FFS1, FFS2, FFS3 and FF4, i.e., 170, 180, 190, and 200, where the solvent and caustic streams are counter-current in principle. The counter-current flow configuration is realized by withdrawing solvent from FFS(n) and fed into FFS(n-1), while caustic stream flows from FFS(n-1) to FFS(n). Here n=2, 3, 4, standing for FFS2, FFS3, and FFS4. A spent solvent stream that contains DSO 400 is withdrawn from the top organic layer 250 inside FFS1 section 170. Caustic stream 800 is mixed with recycle solvent 600 from the third separation section 190 to form stream 900, and enters the second separation section 180 containing a vertical fiber bundle with an inlet distributor 220. The third separation section 190 contains a vertical fiber bundle with an inlet distributor 230 and has a top organic layer 290 inside FFS3 and a bottom caustic layer 300. A recycle solvent stream that contains a low content DSO 500 is withdrawn from the top organic layer 270 inside FFS2 section 180 and is recycled to the top of the oxidizer vessel 160. Caustic stream 120 is mixed with fresh solvent 3000 to form stream 130, and enters the fourth separation section 200 containing a vertical fiber bundle with an inlet distributor 240. A regenerated or lean caustic stream 140, with little or no DSO, is withdrawn from the bottom caustic layer 320 inside FFS4 section 200.

EXAMPLE

To demonstrate the surprising and unexpected performance of our invention, laboratory testing was performed to compare a conventional gravity settler (CGS) to the high surface area fiber separator of our invention. A 1-inch diameter oxidizer loaded with ARI-120L solid catalyst was used to oxidize a rich caustic solution containing about 7000 ppm sulfur of ethyl mercaptide to a conversion level of 99+% at a temperature of about 125° F., 4.0 LHSV and 25 psig back pressure. Air was injected at about 300 ml/min. In separate tests kerosene was injected into the oxidizer at a rate of about 1.5 ml/min.

The effluent from the oxidizer containing about 7000 ppm DSO sulfur as diethyl disulfide was first fed into a 3-inch diameter CGS and allowed to settle via gravity. After 5 and 90 minutes of residence time, the DSO level in the caustic dropped to about 76 and 6 ppm, respectively (FIG. 2).

The CGS was then replaced with a FIBER FILM® separator, with the fibers providing an extremely large surface area. The FIBER FILM® separator contained 150 metal fibers in a shroud placed within a ⅜ inch diameter conduit. This same set-up was used when solvent injection into the oxidizer was performed.

Figure 2:
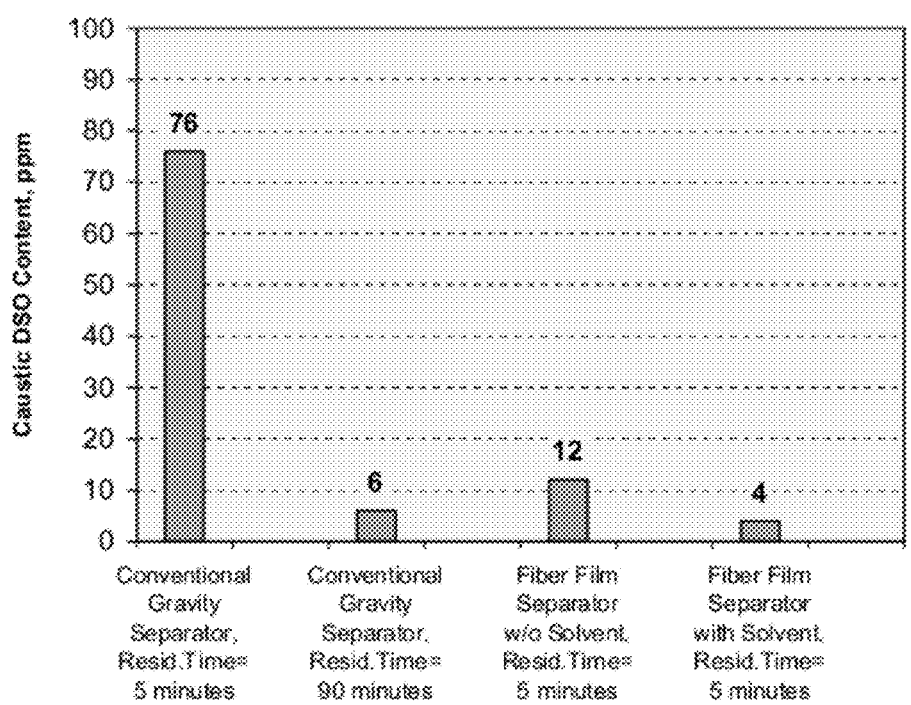
FIG. 2 is a graphical representation showing the effectiveness of our invention compared to a conventional gravity separator.

The graph shown in FIG. 2 shows the comparison of the FIBER FILM® separator to the CGS. With the CGS, the caustic contained 76 ppm DSO at a residence time of 5 minutes. Surprisingly the FIBER FILM® separator of our invention yielded a caustic DSO content of only 12 ppm at the same residence time of 5 minutes.

The effect of adding 5 vol. % of solvent (as kerosene) to the oxidizer is also shown in FIG. 2. The injection of solvent combined with FIBER FILM® separation reduced the DSO content to 4 ppm at a residence time of 5 minutes.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A process for separating mercaptan compounds from a rich caustic stream, comprising, in combination,
   a) feeding solvent, an oxygen containing fluid, and a stream of rich caustic containing mercaptan compounds to a single tower having a top section containing an oxidizer and a bottom section containing at least two contactors comprising fibers in series below the oxidizer;
   b) contacting the stream from step a) with a catalyst in the oxidizer to oxidize the mercaptan compounds to disulfide oil (DSO) at a conversion level of 90% or greater in the presence of oxygen and forming an admixture comprising DSO, solvent, and caustic;
   c) directing the admixture formed in step b) from the oxidizer as a single stream to a first separation section within the single tower where the admixture contacts a bundle of vertical hanging fibers;
   d) separating the DSO and solvent from the caustic within the first separation section by allowing the admixture to flow through the bundle of fibers to form two distinct liquid layers, a first lower layer comprising a caustic phase and an first upper layer comprising a DSO/solvent phase, in a first collection zone;
   e) continuously removing a portion of the DSO/solvent phase from the first separation section;
   f) continuously removing a portion of the caustic phase and mixing with fresh solvent to form a second separation feed that is fed to a second separation section within the single tower where it contacts a second bundle of vertical hanging fibers;
   g) separating any remaining DSO and solvent from the caustic within the second separation section by allowing the second separation feed to flow through the bundle of fibers in the second separation section to form two distinct liquid layers, a second lower layer comprising a caustic phase and an second upper layer comprising a DSO/solvent phase, in a second collection zone;
   h) continuously removing a portion of the DSO/solvent phase from the second separation section and recycling it as the solvent of step a); and
   i) continuously removing a lean caustic stream from the second lower layer.

2. The process of claim 1 where the stream of rich caustic containing mercaptan compounds is oxidized by contacting the stream with a solid bed containing a metal supported catalyst.

3. The process of claim 1 where residual gas is removed as offgas in the first separation section.

4. A counter-current process for separating mercaptan compounds from a rich caustic stream, comprising, in combination,
   a) feeding solvent, an oxygen containing fluid, and a stream of rich caustic containing mercaptan compounds to a single tower having a top section containing an oxidizer and a bottom section containing at least three separation sections containing contactors comprising fibers in series below the top section;
   b) contacting the stream from step a) with a catalyst in the oxidizer to oxidize the mercaptan compounds to disulfide oil (DSO) at a conversion level of 90% or greater in the presence of oxygen and forming an admixture comprising DSO, solvent, and caustic;
   c) directing the admixture formed in step b) from the oxidizer as a single stream to a first separation section within the single tower where the admixture contacts a bundle of vertical hanging fibers;
   d) separating the DSO and solvent from the caustic within the first separation section by allowing the admixture to flow through the bundle of fibers to form two distinct liquid layers, a first lower layer comprising a caustic phase and an first upper layer comprising a DSO/solvent phase, in a first collection zone;
   e) continuously removing a portion of the DSO/solvent phase from the first separation section;
   f) continuously removing a portion of the caustic phase and mixing with a DSO/solvent stream removed from a third separation section to form a second separation feed that is fed to a second separation section within the single tower where it contacts a second bundle of vertical hanging fibers;
g) separating any remaining DSO and solvent from the caustic within the second separation section by allowing the second separation feed to flow through the bundle of fibers in the second separation section to form two distinct liquid layers, a second lower layer comprising a caustic phase and an second upper layer comprising a DSO/solvent phase, in a second collection zone;
h) continuously removing a portion of the DSO/solvent phase from the second separation section and recycling it as the solvent of step a);
i) continuously removing a caustic stream from the second lower layer and mixing with fresh solvent to form a third separation feed that is fed to a third separation section within the single tower where it contacts a third bundle of vertical hanging fibers;
j) separating any remaining DSO and solvent from the caustic within the third separation section by allowing the third separation feed to flow through the bundle of fibers in the third separation section to form two distinct liquid layers, a third lower layer comprising a caustic phase and a third upper layer comprising a DSO/solvent phase, in a third collection zone;
k) continuously removing a portion of the DSO/solvent phase from the third collection zone to be mixed with the caustic phase in step f); and
l) continuously removing a lean caustic stream from the third lower layer in the third collection zone.

5. A counter-current process for separating mercaptan compounds from a rich caustic stream, comprising, in combination,
a) feeding solvent, an oxygen containing fluid, and a stream of rich caustic containing mercaptan compounds to a single tower having a top section containing an oxidizer and a bottom section containing at least four separation sections containing contactors comprising fibers in series below the top section;
b) contacting the stream from step a) with a catalyst in the oxidizer to oxidize the mercaptan compounds to disulfide oil (DSO) at a conversion level of 90% or greater in the presence of oxygen and forming an admixture comprising DSO, solvent, and caustic;
c) directing the admixture formed in step b) from the oxidizer as a single stream to a first separation section within the single tower where the admixture contacts a bundle of vertical hanging fibers;
d) separating the DSO and solvent from the caustic within the first separation section by allowing the admixture to flow through the bundle of fibers to form two distinct liquid layers, a first lower layer comprising a caustic phase and an first upper layer comprising a DSO/solvent phase, in a first collection zone;
e) continuously removing a portion of the DSO/solvent phase from the first separation section;
f) continuously removing a portion of the caustic phase from the first collection zone and mixing with a DSO/solvent stream removed from a third separation section to form a second separation feed that is fed to a second separation section within the single tower where it contacts a second bundle of vertical hanging fibers;
g) separating any remaining DSO and solvent from the caustic within the second separation section by allowing the second separation feed to flow through the bundle of fibers in the second separation section to form two distinct liquid layers, a second lower layer comprising a caustic phase and an second upper layer comprising a DSO/solvent phase, in a second collection zone;
h) continuously removing a portion of the DSO/solvent phase from the second separation section and recycling it as the solvent of step a);
i) continuously removing a caustic stream from the second lower layer and mixing with a DSO/solvent stream removed from a fourth separation section to form a third separation feed that is fed to a third separation section within the single tower where it contacts a third bundle of vertical hanging fibers;
j) separating any remaining DSO and solvent from the caustic within the third separation section by allowing the third separation feed to flow through the bundle of fibers in the third separation section to form two distinct liquid layers, a third lower layer comprising a caustic phase and a third upper layer comprising a DSO/solvent phase, in a third collection zone;
k) continuously removing a portion of the DSO/solvent phase from the third collection zone to be mixed with the caustic phase in step f);
l) continuously removing a caustic stream from the third lower layer in the third collection and mixing with fresh solvent to form a fourth separation feed that is fed to a fourth separation section within the single tower where it contacts a fourth bundle of vertical hanging fibers;
m) separating any remaining DSO and solvent from the caustic within the fourth separation section by allowing the fourth separation feed to flow through the bundle of fibers in the fourth separation section to form two distinct liquid layers, a fourth lower layer comprising a caustic phase and a fourth upper layer comprising a DSO/solvent phase, in a fourth collection zone;
n) continuously removing a portion of the DSO/solvent phase from the fourth collection zone to be mixed with the caustic phase in step i); and
o) continuously removing a lean caustic stream from the fourth lower layer in the fourth collection zone.

* * * * *